United States Patent [19]

Brown

[11] Patent Number: 5,989,692
[45] Date of Patent: Nov. 23, 1999

[54] POROUS SURFACE FOR LABORATORY APPARATUS AND LABORATORY APPARATUS HAVING SAID SURFACE

[75] Inventor: James F. Brown, Clifton, Va.

[73] Assignee: Cytonix Corporation, Beltsville, Md.

[21] Appl. No.: 08/921,796

[22] Filed: Sep. 2, 1997

[51] Int. Cl.$^6$ .............................. B32B 7/02; B32B 3/26
[52] U.S. Cl. .................. 428/215; 428/304.4; 521/178
[58] Field of Search ......................... 521/178; 428/215, 428/304.4

[56] References Cited

U.S. PATENT DOCUMENTS

| | | | |
|---|---|---|---|
| 3,661,267 | 5/1972 | Markley | 521/178 |
| 4,024,089 | 5/1977 | Moilliet et al. . | |
| 4,043,950 | 8/1977 | Wilmsen | 521/178 |
| 4,087,154 | 5/1978 | Menzel . | |
| 4,407,882 | 10/1983 | Hauser et al. . | |
| 4,474,110 | 10/1984 | Rosner . | |
| 4,481,246 | 11/1984 | Melisz et al. . | |
| 4,482,648 | 11/1984 | Norman . | |
| 4,679,914 | 7/1987 | Rosenberg . | |
| 4,705,705 | 11/1987 | Bross . | |
| 4,777,020 | 10/1988 | Brigati . | |
| 4,786,558 | 11/1988 | Sumiya et al. . | |
| 5,002,736 | 3/1991 | Babbitt et al. . | |
| 5,066,684 | 11/1991 | LeMay | 521/178 |
| 5,111,344 | 5/1992 | Robinson, Jr. . | |
| 5,166,184 | 11/1992 | Hashimoto et al. | 521/178 |
| 5,413,218 | 5/1995 | Shimokuni et al. . | |
| 5,501,725 | 3/1996 | Lauw et al. . | |
| 5,598,295 | 1/1997 | Olofson . | |

OTHER PUBLICATIONS

Fluorinet Liquids 1944 Product Information bulletin, 3M Specialty Chem. Div. (1994).
Concise Encyclopedia of Polymer Science & Engineering, J. Wiley & Sons, pp. 89–90 (1990).
Concise Encyclopedia of Polymer Science & Engineering, Wiley & Sons, pp. 118–121 (1990).
Sartomer 1997 Product Catalog, Sartomer Company, pp. 29,41 (1997).
Fluorinert Electronic Liquids 1989 Product Information bulletin, 3M Indus. Chem. Prods. Div. (1989).
Norland UV–Curing Adhesives Technical Data bulletin (table re: NOA and NEA) Norland Products Inc.
UV Activated Epoxy Curative FX–512, 3M Product Information bulletin, 3M Indus. Chem. Prods. Div. (1986).
Epoxy Curing Agents and Diluents Products Guide, (Section re Epoxy Curing Agents), Air Products, Inc. (not dated).
Methyl Hexahydro Phthalic Anhydride information bulletin, Anhydrides and Chemicals Inc. (not dated).
D.E.N. Epoxy Novolac Resins Product Specification Guide, Eastech Chemical, Inc. (1983).
Teflon MP 1300 Technical Information bulletin, DuPont Fluoroproducts (1994).
Erisys GE30 Technical Bulletin, CVC Specialty Chemicals, Inc. (1991).

*Primary Examiner*—Morton Foelak
*Attorney, Agent, or Firm*—Kilyk & Bowersox, P.L.L.C.

[57] ABSTRACT

A coating formulation for making a porous coating on a laboratory apparatus is provided. The formulation comprises 100 parts by weight hardenable resinous material, and from about 0.1 to about 50 parts by weight blowing agent based on the 100 parts by weight resinous material. The resinous material has a hardening time which is sufficiently short such that gas generated by the blowing agent is entrapped within the resinous material. The coating formulation is hardenable upon application to a surface of a laboratory apparatus to form a porous coating which is used for marking purposes or for the retention of biological samples. Methods of retaining a biological sample on a coated laboratory apparatus are also provided.

21 Claims, No Drawings

POROUS SURFACE FOR LABORATORY APPARATUS AND LABORATORY APPARATUS HAVING SAID SURFACE

FIELD OF THE INVENTION

The present invention relates to laboratory apparatus including microscope slides and vessels for handling, measuring, reacting, incubating, containing, storing, restraining, isolating and transporting biological samples. The present invention also relates to a porous coating having a porous marking surface or a porous biological sample retaining surface.

BACKGROUND OF THE INVENTION

Laboratory apparatus including microscope slides, microtiter plates, vials, flasks, test tubes, syringes, coverslips, films and porous substrates, and assemblies comprising such devices, are often used to handle, measure, react, incubate, contain, store, restrain, isolate and transport important and sometimes minute volumes of liquid, particularly biological samples. Often there is a need to mark the apparatus to prevent confusion among samples when working with multiple samples. Accordingly, there is a need for a marking surface on a laboratory apparatus.

It is well known to frost a portion of the surface of a laboratory apparatus to form a marking surface. The frosted area is created by sandblasting, acid etching, mechanical abrading, or other methods of roughening the surface of the apparatus to create a surface which may be marked with a pen, pencil, or other marking instrument. Despite the matte finish of a roughened marking surface, permanent marking of the apparatus is nonetheless not assured.

The aforementioned techniques create a frosted surface by removing material from the apparatus surface, which necessarily results in a marking surface which is recessed from, or no higher than, the surface of the apparatus. The marking surface therefore does not provide a means of spacing stacked flat apparatus, for example, microscope slides. In addition, the marking surface is not provided with a pronounced background to contrast with marking material marked thereon.

Coating formulations which can be applied to a laboratory apparatus to form a marking surface are also known. A raised marking surface for a microscope slide is disclosed in U.S. Pat. No. 4,481,246 to Melisz et al. This patent discloses a resin-based coating having a sufficient amount of granular medium to impart porosity to the coating. To impart porosity, however, very high loadings of the granular medium are required; otherwise, the liquid epoxy in the formulation engulfs the granular medium and forms a smooth non-porous texture at the exposed surface of the coating. The high loadings of granular medium require the formulation to be highly viscous and have a limited range of rheological properties. Heavily loaded coatings are weakened or embrittled by the presence of large amounts of clay or pigment, and the permanence of a marking material applied to the surface may be compromised by marking and handling the coating. Furthermore, because so much of the coating formulation comprises granular medium, the chemical resistance afforded by the epoxy resin is diminished relative to the chemical resistance afforded by a coating comprising more substantial amounts of resinous material. Coatings which are believed to be made in accordance with the teachings of U.S. Pat. No. 4,481,246 to Melisz et al. are not chemically resistant to sodium hydroxide solutions and are measurably weakened by exposure to hydrochloric acid solutions in ethanol, boiling deionized water, xylene, and ethanol. In addition, coatings made in accordance with the patent may chalk, that is, the surface may break down to a powder upon contact with a marking instrument, which is especially undesirable in surfaces for identifying a sample or retaining a biological sample.

The surfaces of laboratory apparatus, for example, petri dishes, microscope slides and microtiter plates are often treated to enable the growth, manipulation and maintenance of cell cultures. These superficial treatments include exposure of plastic surfaces to electromagnetically generated plasmas using various gases or exposure of glass surfaces to silanizing liquids and gases. Often, the aforementioned exposure steps are followed by the application of coatings of extracellular matrix proteins. Cell types have been coated to a surface of a laboratory apparatus and maintained and/or grown by the effusion of nutrients and cell factors to their attached surfaces. Some cell types benefit from a cavernous or cave-like topology.

Superficial, and generally monomolecular treatments of laboratory apparatus to provide cell growth surfaces do not allow the effusion of nutrients or cell factors at their interface with cells, nor do they have a porous topology. It is desirable to provide a coating for a laboratory apparatus that allows the effusion of nutrients or cell factors at the interface of the coating and cells, and which has a porous topology.

There is a need for an even more permanent marking surface for laboratory apparatus, and for a formulation that provides more permanence and better Theological properties including thixotropy and viscosity. There is a need for a coating formulation that can be applied by a pad printing technique to provide a marking surface. There is a need for a coating formulation that can be printed onto a laboratory apparatus to form a biological sample-retaining coating useful for growing and analyzing a biological sample. There is also a need for a permanent coating material for laboratory apparatus which can promote the growth, life, maintenance or preservation of a biological sample.

The present invention provides a formulation which can be applied to a laboratory apparatus and dried or cured to form a coating having a porous surface. The present invention also provides a laboratory apparatus having a porous surface which can be used as a marking surface for substantially permanent marking applications. The present invention also provides a laboratory apparatus having a porous coating which can be used for retaining a biological sample.

SUMMARY OF THE INVENTION

The present invention relates to a coating formulation for forming porous surfaces on laboratory apparatus. According to embodiments of the invention, a coating formulation is provided comprising a hardenable resinous material and a blowing agent. The material and agent selected, and the relative amounts of each, are provided such that the formulation can be applied to a laboratory apparatus and hardened by curing, drying or cooling to provide a hard coating having a porous surface. The present invention also provides a laboratory apparatus having a porous surface useful as a permanent marking surface. The present invention also provides a laboratory apparatus having a porous surface useful for retaining a biological sample. Coatings according to embodiments of the present invention exhibit excellent weatherability, chemical resistance, adhesion, low shrinkage, heat resistance, abrasion resistance, impact strength, and water resistance, and do not chalk or form powders when marked upon.

According to embodiments of the invention, a coating formulation is provided comprising 100 parts by weight resinous material, from about 0.1 to about 50 parts by weight blowing agent, from 0 to about 500 parts by weight solvent for the resinous material, from 0 to about 100 parts by weight resinous material curing agent, from 0 to about 5 parts by weight adhesion promoting material, from 0 to about 300 parts by weight pigment, and from 0 to about 50 parts by weight dispersing agent.

The resinous material preferably has a fast hardening time or fast cure response. Preferably, the resinous material cures or dries very quickly so that gas-generated by the formulation during curing or drying of the resinous material can be entrapped within the hardened resinous material. Preferably, the resinous material cures or dries fast enough so that gas-generated by the coating formulation does not completely escape from the resinous material before the material is substantially cured or dried. Exemplary resinous materials include ultraviolet-curable and/or curable epoxy resins.

The blowing agent, or gas-generating agent, preferably forms a gas which is insoluble under the hardening conditions of the resinous material. As gas bubbles are formed during curing or hardening of the resinous material, the bubbles migrate toward the upper surface of the coating due to gravity. As some of the bubbles pop or are broken at the upper surface of the coating, they form openings or pores at the surface resulting in a porous surface.

As the blowing agent generates gas, the resulting gas bubbles form a network of cellular voids throughout the resinous material, at least at the surface of the coating. According to embodiments of the invention, the coating formulation forms a microporous foam state wherein at least the operational exposed surface of a coating made from the formulation is at least partially foamed and porous.

According to embodiments of the invention, the coating formulation forms a hard foam upon drying or curing, and provides a porous surface which is excellent for permanently retaining marking materials and/or for retaining biological samples for analysis. According to some embodiments of the invention, the porous surface may preferably be hydrophilic so as to readily absorb and retain many marking formulations including water-based inks. According to embodiments of the invention, the surface energy or surface chemistry of the porous surface may be adjusted using selected resins, co-resins or surface-active agents to best accommodate marking materials. The surface openings or pores enable penetration, absorption, capillary force holding and retention of marking material applied to the coating.

According to some embodiments of the invention, the openings or pores formed from gas bubbles generated within the coating formulation form an excellent retention mechanism for the manipulation and retention of a biological sample. As a cell growth apparatus, the coating may be applied to an apparatus surface, for example, the surface of a microscope slide, and loaded with sample. The sample can then be retained in the porous coating and observed over a period of time. According to some embodiments of the invention, a retained biological sample loaded into the porous surface may be maintained with nutrients and air over a period of time, and thus the growth and development of biological material, for example, a cell culture may be observed and analyzed. According to embodiments of the invention, the surface energy or surface chemistry of the porous surface may be adjusted using selected resins, co-resins or surface-active agents to best facilitate cell growth.

According to embodiments of the invention, the viscosity of the coating formulations may be adjusted by addition of solvents. Other optional additives may also be included in the coating formulation according to embodiments of the invention. In addition to solvents, other additives including flow control agents, leveling agents, and surfactants may be incorporated to improve the printability or applicability of the coating formulation, and/or to improve the texture, appearance or permanent markability of the hardened porous coating.

DETAILED DESCRIPTION OF THE INVENTION

According to embodiments of the present invention, apparatus for handling, measuring, reacting, incubating, containing, storing, restraining, isolating and transporting liquids are coated with a coating formulation which includes a gas-generating agent and a resinous material. The resinous material cures, dries or otherwise hardens sufficiently quickly to entrap gas bubbles generated by the gas-generating agent. The cured or dried hardened coating exhibits a porous surface, formed by the gas bubbles, at the surface of the coating. The porous surface is excellent for marking applications and can be formulated to readily and permanently accept many marking mediums including inks and pencil. The porous foamed coatings are also chemically resistant, more so than porous non-foamed coatings which attribute porosity to a sufficient amount of granular medium.

According to embodiments of the invention, the coating formulation is applied to a laboratory apparatus at a thickness sufficient to form a markable surface. Because a markable surface may be obtained from a very thin coating, coating thicknesses of less than about 100 mils may be used, for example, thicknesses of less than about 2 mils. According to some preferred embodiments of the invention, coating thickness of less than or equal to about 1 mil are provided.

Particular laboratory apparatus which can be coated according to the present invention incude microscope slides, microscope slide assemblies, microscope slide coverslips, petri dishes, vials, flasks, test tubes, syringes, sample chambers for analytical devices, tapes, laminates, plates, arrays, tubing, and devices and apparatus with operational surfaces comprising plastic, sintered materials, semiconductors, glass, ceramic, metal and primed or pre-coated surfaces. The invention may also be used on operational surfaces which are porous, smooth, rough, pitted, grooved, cross-hatched, striated, or patterned with physical features.

According to some embodiments of the invention, a coating formulation is provided having a porous surface which provides an excellent retention mechanism for the manipulation and retention of a biological sample. As a cell growth apparatus, the coating may be applied to an apparatus surface, for example, the surface of a microscope slide, and loaded with sample. The sample can then be retained in the porous coating and observed over a period of time. According to some embodiments of the invention, a retained biological sample loaded into the porous surface may be maintained with nutrients and air over a period of time, and thus the growth and development of biological material, for example, biological material comprising a cell culture, may be observed and analyzed.

According to some embodiments of the invention, the laboratory apparatus comprises a microscope slide or other substantially flat device having an operational surface at least partially coated with a coating formulation according to the invention. The porous coating may be used to retain, contain or isolate a biological sample and is particularly useful as a cell growth surface for the development, growth, life or preservation of a biological sample. A biological sample can thus be isolated on and in the porous surface and subjected to chemical and biological reactions.

According to embodiments of the invention, the porous coating is scratch-resistant to a # 4 pencil. According to some embodiments of the invention, the porous coating is scratch-resistant to a # 6 pencil. According to some preferred embodiments of the invention, the porous coating is scratch-resistant to a # 8 pencil.

According to embodiments of the invention, a coating formulation is provided comprising 100 parts by weight hardenable resinous material, from about 0.1 to about 50 parts by weight blowing agent, from 0 to about 500 parts by weight solvent for the resinous material, from 0 to about 100 parts by weight curing agent, from 0 to about 5 parts by weight adhesion promoting material, from 0 to about 300 parts by weight pigment, and from 0 to about 50 parts by weight dispersing agent.

According to embodiments of the invention, the resinous material may comprise at least one material selected from the group consisting of curable resinous materials, resinous materials that harden upon drying, and dry-melt resinous materials. Exemplary of curable-resins are ultraviolet-curable, photo-curable, 2-part curable, moisture curable, catalyst curable, and heat-curable resins. Exemplary of photo-curable resins are polymerizable acrylates. Exemplary of resinous materials that harden upon drying include water-soluble resins, epoxy resins, urethanes, silicones, acrylics, latexes, polyesters and cellulosics. Exemplary of dry-melt resinous materials are polyethylene and other thermosetting or thermoplastic resins. Curable resins, and resins that harden upon drying, are preferred for the resinous material according to embodiments of the invention.

According to embodiments of the invention, the resinous material is formed into a cellular polymer. According to embodiments of the invention, the resinous material may comprise one or more at least partially foamable polymer selected from the group consisting of epoxy resins, urethane monomers and/or polymers including curable urethane resins, cellulose acetate, phenolic resin, polyethylene, polystyrene, silicones, urea-formaldehyde resins, latex foam rubbers, natural rubbers, synthetic elastomers, poly(vinyl chloride), ebonite, polytetrafluoroethylene, and the cellular polymers set forth at pages 118–121 of *Concise Encyclopedia of Polynier Science and Engineering*, Kroschwitz (Executive Editor), John Wiley & Sons, Inc. (1990), which is herein incorporated by reference in its entirety.

According to embodiments of the invention, the resinous material may comprise an unsaturated resin, that is, a resin which comprises a component having a double bond, for example, an ethylenically unsaturated component, or a component having a triple bond, for example, a component having an isocyanate bond.

According to embodiments of the invention, the resinous material may comprise a UV-curable, visible light-curable or heat-curable resin. Other hardenable resins which may be used include polymerizable acrylate resins, for example, the urethane acrylate oligomer resins set forth in the *SARTOMER Products Catalog* (pp. 28–29, 1997) which is herein incorporated by reference in its entirety. The SARTOMER urethane acrylate resin CN 980 is preferred. The urethane acrylates disclosed at pages 28–29 of the *SARTOMER Products Catalog* generally exhibit excellent weatherability, chemical resistance, adhesion, low shrinkage, heat resistance, abrasion resistance, impact strength, and water resistance. These properties make the urethane acrylate resins particularly preferred resinous materials.

According to embodiments of the invention, a curable acrylate resin is used as the resinous material and a curing agent is present. The curing agent may preferably comprise a photoinitiator. Exemplary photoinitiators for acrylates include the ESACURE and BP photoinitiators set forth on pages 40 and 41 of the *SARTOMER Product Catalog* (1997), which is also incorporated herein by reference, in its entirety. A preferred photoinitiator to be used with a urethane acrylate is the SARTOMER photoinitiator ESACURE KIP100F —a clear yellow liquid comprising alpha hydroxy ketone. ESACURE KIP100F is a preferred photoinitiator for the SARTOMER urethane acrylate CN 980, According to embodiments of the invention, epoxy resins including novolac epoxy resins may be used as the resinous material. Epoxides comprising cycloaliphatic and diglycidyl ether of Bisphenol A (DGEBA), for example, may be used. FX-512 may be used as an epoxy catalyst according to embodiments of the invention. FX-512 is described in the 3M Industrial Chemical Products Division Product Information Bulletin *UV Activated Epoxy Curative* FX-512 (1986), which is herein incorporated by reference in its entirety. Wetting and leveling agents may be used according to some embodiments of the invention wherein an epoxy resin is the resinous material. Wetting and leveling agents which may be used include FLUORAD FC-171 and FC-430 fluorochemical surfactants available from 3M Industrial Chemical Products Division, St. Paul, Minn.

According to embodiments of the invention, an epoxy resin comprising trimethylol propane triglycidyl ether is used as the resinous material, for example, ERISYS GE 30, available from CVC Specialty Chemicals, Inc, Cherry Hill, N.J.

Another preferred class of resinous materials is the class of D.E.N. epoxy novolac resins identified as D.E.N. 431, D.E.N. 438, D.E.N. 438-A85, D.E.N. 438-EK85, D.E.N. 438-MK75, D.E.N. 439, D.E.N. 439-EK85, and D.E.N. 485, available from Eastech Chemical, Inc., Philadelphia, Pa., and described in the Dow Chemical U.S.A. bulletin *D.E.N. Epoxy Novolac Resins Product Specification Guide* (1982). According to embodiments of the invention, the epoxy resins D.E.N. 438, D.E.N. 438-EK85, D.E.N. 438-MK75, D.E.N. 439 and D.E.N. 439-EK85 are preferred resins for the resinous material. According to embodiments of the invention, the epoxy resins D.E.N. 438, D.E.N. 439, and D.E.N. 439-EK85 are more preferred resins for the resinous material.

Optical and electronic adhesives which may be used as the resinous material include the NORLAND adhesives set forth in the publication of Norland Products, Inc., *Norland UV Curing Adhesives*, which is incorporated herein by reference in its entirety. NORLAND adhesives which may be used according to embodiments of the invention include adhesives comprising a urethane, an acrylic or a mercapto ester. The adhesives include the UV curable Norland adhesives NOA 60, NOA 61, NOA 63, NOA 65, NOA 68, NOA 71, NOA 73, NOA 81, NOA 88 and UVS 91, the UV/heat-curable adhesives NOA 83H, NEA 121 and NEA 123, the UV/vis-curable adhesives NOA 72, and the heat-curable adhesive NEA 155. Norland NOA 81 is a preferred UV-curable adhesive for use as the resinous material.

According to embodiments of the invention, the gas-generating agent, also referred to as a blowing agent or a foaming agent, produces gas and may be used to generate cells (gas pockets) in the resinous material. The gas-generating agents used according to embodiments of the invention may be classified as either physical or chemical blowing agents. Herein, the term "gas-generating agent" is to be understood as including physical and chemical blowing agents, including physical blowing agents which generate gas upon boiling. According to embodiments of the invention, a gas-generating agent is preferably selected which can provide (1) long-term storage stability under fairly ordinary conditions, (2) gas release over a controlled time and temperature range, (3) low toxicity, odor, and color in both the agent itself and in its decomposition products, (4) no deleterious effects on the stability and processing characteristics of the polymer, (5) the ability to produce cells of uniform size, (6) The ability to produce stable foam, that is, a foam wherein gas is not lost from the cell causing it to collapse, and (7) good cost-performance relation and availability.

According to embodiments of the invention, the gas-generating agent is a physical blowing agent which creates gas by a phase change, for example, a liquid may be volatilized, or a gas dissolved in a polymer under high pressure may be desorbed by decompression. Chemical blowing agents which may be used according to embodiments of the present invention produce gas by thermal decomposition and, in a few instances, via a chemical reaction with other components of the polymer system. A discussion of blowing agents is found at pages 89–90 of *Concise Encyclopedia of Polymer Science and Engineering*, Kroschwitz (Executive Editor), John Wiley & Sons, Inc. (1990), which is herein incorporated by reference in its entirety.

The gas generating agent may be a physical blowing agent comprising at least one of n-pentane, 2,2-dimethylpropane, 1-pentene, n-hexane, 2-methylpentane, 3-methylpentane, 2,2-dimethylbutane, cyclohexane, n-heptane, 2,2-dimethyl pentane, 2,4-dimethylpentane, 3-ethylpentane, 1-heptene, toluene, trichloromethane, tetrachloromethane, trichlorofluoromethane, methanol, 2-propanol, isopropyl ether, methyl ethyl ketone, and fluorinated hydrocarbon solvents.

According to embodiments of the invention, the gas-generating agent may comprise fluorinated liquids, for example, fluorinated organic liquids as disclosed in the product bulletin 1994 *Fluorinert Liquids*, available from 3M Specialty Chemicals, West Caldwell, N.J. FLUORfNERT liquids that may be used according to the present invention include FC-84, FC-77, FC-104, FC-75, FC-40, FC-43, FC-70, FC-71 FC-5312, FC-5320, FC-5350. According to embodiments of the invention, the FLUORINERT liquids FC-40. FC-43, FC-70, FC-71, FC-5312, FC-5320, and FC-5350 are preferred gas-generating agents. According to embodiments of the invention, the FLUORINERT liquids FC-70, FC-71 and FC-5312 are more preferred gas-generating agents. The foregoing and other FLUORINERT liquids are disclosed, for example, in the aforementioned 1994 *Fluorinert™ Liquids* product information bulletin and in the *Fluorinert™ Electronic Liquids* 1989 Product Information bulletin available from 3M Industrial Chemical Products Division, St. Paul, Minn. Other fluorinated solvents which may be used include Vertrel® XF ($C_5H_2F_{10}$) or Freon TF, both available from DuPont, Wilmington, Del., or the fluorinated polyethers HT70, HT85, HT90, HT100, HT110, HT135, HT200, HT230, HT250, HT260 and HT270, and the perfluorinated polyethers sold as GALDEN, all from Ausimont USA, Inc. The Ausimont USA, Inc. solvent designations indicate the boiling point of each solvent. Higher boiling solvents, for example, HT250, HT260 and HT270, require more heat to volatilize than coatings made with the lower boiling solvents. The lower boiling Ausimont USA, Inc. solvents, for example, HT70, more rapidly evaporate when compared to the higher boiling solvents. AUSIMONT HT260 is a preferred fluorinated solvent to use as a physical blowing agent according to embodiments of the invention.

Other fluorocarbon solvents may be used as physical blowing agents, and preferably have boiling ranges of from about 30° C. to about 250° C. At least partially fluorinated solvents are preferred for physical blowing agents, particularly those fluorocarbon solvents having at least about 20% by weight fluorine atoms per molecule.

According to some embodiments of the invention, the gas-generating agent may be a chemical blowing agent and may comprise, for example, an azide composition which releases nitrogen gas ($N_2$) upon activation, sodium bicarbonate $NaHCO_3$ which release $CO_2$ upon activation. Other chemical blowing agents which may be used according to embodiments of the invention include dinitrosopentamethylenetetramine, sulfonyl hydrazides, azodicarbonamide, p-toluenesulfonyl semicarbazide, 5-phenyltetrazole, diisopropylhydrazodicarboxylate, 5-phenyl-3,6-dihydro-1,3,4-oxadiazine-2-one, and sodium borohydride.

According to embodiments of the invention, the gas-generating agent is compatible with the resinous material. The gas-generating agent should preferably generate gas under the conditions necessary to harden the resinous material. Therefore, if a heat-curable resinous material is used, the gas-generating agent should generate gas at about the temperature required for heat-curing the material. If a resinous material that hardens upon drying is used, the gas-generating agent should not require heat to generate gas. If a UV-curable resinous material is used, the gas-generating agent is preferably UV-activated.

According to embodiments of the invention, the gas-generating agent is preferably compatible with the resinous material such that a homogenous mixture of the two components may be achieved, enabling a uniformly porous surface on a coating made from the formulation.

According to embodiments of the invention, the gas-generating agent is used in an amount effective to generate sufficient gas to provide a cellular foamed polymer. The gas-generating agent may be present in an amount of from about 0.1 to about 50 parts by weight based upon 100 parts by weight of the resinous material. According to embodiments of the invention, the gas-generating agent may be present in an amount of from about 0.5 to about 20 parts by weight, for example, from about 1 to about 5 parts by weight based upon 100 parts by weight of the resinous material.

As the blowing agent generates gas, the resulting gas bubbles form a network of cellular voids throughout the resinous material, at least at the surface of the coating. According to embodiments of the invention, the coating formulation forms a miroporous foam state wherein at least the operational exposed surface of a coating made from the formulation is at least partially foamed and porous. According to embodiments of the invention, the coating formulation forms a hard foam upon drying or curing, and provides a porous surface. The pores formed according to some preferred embodiments of the invention are microporous. According to some embodiments of the invention, the pores may have an average pore size of from about 0.1 to about 10 microns in at least one dimension, for example, from about 0.5 to about 3 microns.

In embodiments wherein a fluorocarbon liquid is used as a physical blowing agent, the agent may form vertical tunnels extending to the surface of the hardened coating. According to embodiments of the invention, pores comprising vertical tunnels having lengths of up to about 25 microns may be provided. These "worm hole" tunnels may be achieved by using a fluorinated liquid as a blowing agent, and are preferred due to the excellent capillary forces the tunnels exert on a liquid marking material applied to the porous surface of the coating. Some chemical blowing agents including sodium bicarbonate may be used to form more spherically-shaped pores as opposed to the tunnel-shaped pores achieved with fluorinated physical blowing agents.

According to embodiments of the invention, the formulation may comprise an adhesion promoter. If present, an adhesion promoter may promote adhesion between a coating made from the formulation and the surface of a laboratory apparatus. Exemplary of adhesion promoters are glycidoxysilanes, including 3-glycidoxypropyl-trimethoxysilane. An exemplary gamma-glycidoxypropyltrimethoxy-silane is available from Union Carbide as Silicone A-187.

Coupling agents may also be used as adhesion promoting monomers. Exemplary coupling agents include vinyltrimethoxysilane, chloropropyltrimethoxysilane, 3-glycidoxypropyltrimethoxysilane, and 3-methacryloxypropyl-trimethoxysilane. Such silanes and coupling agents, if present, can be present in amounts of from about 1 part by weight to about 10 parts by weight, more preferably from about 2 parts by weight to about 5 parts by weight, based on 100 parts by weight of resinous material.

Linkage mechanisms for binding the resinous material of the present coating formulations to an operational surface of a laboratory apparatus may be incorporated with the resinous material and include functional linkage groups such as peroxide catalyzed linkages, azo catalyzed linkages, free radical induced linkages, cationically induced linkages, radiation induced linkages, vinyl linkages, methacrylate linkages, urethane linkages, epoxy linkages, silane linkages, and siloxane linkages.

Other adhesion promoting monomers can be added to the coating formulations of the invention. If used, adhesion promoting monomers other than silanes may preferably be used in amounts of from about 1% by weight to about 40% by weight, more preferably from about 5% by weight to about 20% by weight, based on the weight of the polymerization product making up the coating material. Adhesion promoting monomers which may be used include alkoxy terminated monomers and methacrylate esters and acrylate esters listed as adhesion promoting monomers on page 16 of the 1994 Sartomer Product Catalog, including mono-, di- and tri-functional acrylate or methacrylate ester monomers.

According to embodiments of the invention, the formulation may comprise a curing agent to promote or enable curing of the resinous material. The curing agent may be a catalyst, an initiator or a reactant. According to embodiments of the invention, the curing agent may be a free-radical initiator, a cationic catalyst, a photoinitiator, a co-catalyst, or a co-agent. The curing agent may catalyze or initiate a reaction which results in a hardening of the resinous material, for example, a polymerization or cross-linking reaction. The curing agent may be a reaction promotor, which promotes, as opposed to catalyzes, a hardening reaction such as a polymerization or cross-linking reaction.

The amount of curing agent to be used, if any, will depend upon the hardening mechanism of the resinous material. The curing agent should be present in an amount sufficient to harden the resinous material and trap generated gas bubbles therein, yet not in an amount which substantially adversely affects the hardness of the cured coating or the porosity of the exposed surface of the coating.

According to embodiments of the invention, the resinous material comprises an epoxy resin and a curing agent. The curing agent may be used in amounts of from about 1 part by weight to about 100 parts by weight based on 100 parts by weight epoxy resin. The curing agent may be a catalyst or a reactant, for example, the reactant dicyandiamide. For example, in formulations according to embodiments of the invention wherein a novolac epoxy resin is used as the resinous material, an exemplary curing agent may comprise dicyandiamide, preferably in an amount of from about 5 parts by weight to about 10 parts by weight based on 100 parts by weight of the novolac epoxy resin, for example, about 8 parts by weight dicyandiamide.

According to some embodiments of the invention, a novolac epoxy resin is used in combination with a dicyandiamide curing agent. An exemplary high functionality novolac epoxy resin is D.E.N. 439, available from The Dow Chemical Company, Midland, Mich. D.E.N. 439 has an epoxy functionality of 3.9, an epoxy equivalent weight of about 220, and a high cross-link density. Dicyandiamide may be included in the coating formulation in an amount of from about 5 parts by weight to about 10 parts by weight, preferably about 8 parts by weight based on 100 parts by weight of the D.E.N. epoxy resin.

Another curing agent which may be used according to embodiments of the invention wherein the resinous material comprises an epoxy resin is methyl hexahydro phthalic anhydride (MHHPA). MHHPA is available from Anhydrides and Chemicals Inc., of Newark, N.J. MHHPA may preferably be used in an amount of from about 85 to about 90 parts by weight based on 100 parts by weight of an epoxy resinous material having an epoxy functionality of from about 175 to about 210.

Other epoxy curing agents and epoxy diluents are described in the Air Products bulletin *Epoxy Curing Agents and Diluents Product Guide* (1992) and include the dicyandiamides AMICURE CG-1200 and AMICURE CG-1400, the imidazoles CUREZOL 2MZ-Azine, CUREZOL 2PHZ-S, and CUREZOL 2MA-OK, and the modified aliphatic amines ANCAMINE 2014AS, and ANCAMINE 2014FG, all available from Air Products and Chemicals, Inc., Allentown, Pa.

According to embodiments of the invention, one or more solvent may be included in the coating formulation. A solvent may be included to decrease the viscosity of the formulation, for example, to make the formulation more easily printable for application to a laboratory apparatus. The selection of a solvent depends upon the coating formulation, and generally depends upon the solubility of the resinous material in the solvent. For example, preferred solvents for a novolac epoxy may be triethylphosphate (TEP) and ethylene glycol. Other solvents may include methyl ethyl ketone, acetone, toluene, xylene and other organic solvents. A preferred epoxy resin solvent is a mixture of TEP in methyl ethyl ketone in a weight ratio of, for example, about 3:1. For some resins, including water-soluble silicone resins, water may be a preferred solvent. For a dry-melt resin powder formulation, the formulation may be substantially free of solvent.

The amount of solvent to be included generally will depend on the particular resinous material employed and the desired viscosity of the coating formulation. According to embodiments of the invention, the amount of solvent present in the coating formulation may be from 0 to about 500 parts by weight based on 100 parts by weight of the resinous material, for example, from 0 to about 200 parts by weight solvent.

According to embodiments of the invention, from about 1 part by weight to about 100 parts by weight epoxy solvent, based on 100 parts by weight of the resinous material, may be included in coating formulations containing an epoxy resinous materials. Epoxy solvents can be added to liquefy the epoxy monomer or resin or adjust the viscosity thereof. A separate epoxy solvent may not be needed according to some embodiments of the invention wherein the epoxy is liquid at room temperature or wherein a fluorinated monomer or surfactant component of the coating formulation acts as a solvent for the epoxy.

According to embodiments of the invention, the formulation may comprise a dispersing agent. If present, a dispersing agent may be used in an amount of up to about 50 parts by weight based on 100 parts by weight resinous material. According to embodiments of the invention, up to about 20 parts by weight dispersing agent may be included in the coating formulation, based on 100 parts by weight resinous material, for example, up to about 5 parts by weight dispersing agent. The dispersing agent may comprise a fluoroadditive micropowder.

A preferred dispersing agent is the micropowder fluoroadditive Teflon® MP 120, available from DuPont Polymer Products Department, Wilmington, and Del., and described in the DuPont Technical Information bulletin Teflon® MP 120 (1994) Teflon® MP 1200 has an average particle diameter of about 4 μm. Teflon® MP 1200, and other dispersing agents, aid in substantially homogeneously dispersing the blowing agent throughout the resinous material. Dispersing agents preferably provide a uniform distribution of gas cells throughout at least the surface of a hardened coating made from the formulations of the invention.

According to embodiments of the invention, the coating formulation may include one or more pigment. The amount of a pigment which may be used will depend upon the color strength of the particular pigment and the desired shade of the pigment. According to some embodiments of the invention, from 0 to about 300 parts by weight pigment may be used in the coating formulation, based upon 100 parts by weight resinous material.

Pigments which may be used in accordance with the invention include ferrous oxides, titanium dioxides, cobalt titanate green spinels, nickel antimony titanium yellow rutiles, and cobalt chromite blue-green spinels. Commercially available pigments which may be used include the pigments Ferro RED, GREEN 50 (green pigment product code V-1 1633), YELLOW 53 (yellow pigment product code V-9412), GREEN 50 (blue pigment product code V-9229) and BLUE 36 (blue pigment product code V-9238), all available from Ferro Corporation, Edison, N.J.; RED LAKE C available from Sun Chemical Corporation, Cincinnati, Ohio; and TI-PURE (titanium dioxide white pigment) available from Du Pont Company, Wilmington, Del.

According to embodiments of the invention, a kit is provided which has a base resin mixture and a selection of pigments which may be added to portions of the base mixture to form any of a wide variety of colored porous coating formulations. Mixtures of pigments may be added to a portion of the base mixture to provide colors other than primary colors, for example, orange, purple and pink.

In addition to the foregoing additives, other agents including flow control agents, leveling agents, surfactants and plasticizers, including high molecular weight polymers, fluorosurfactants, and silicone surfactants, may be included in the coating formulations according to embodiments of the present invention. Coating formulations according to embodiments of the invention may comprise such agents to improve printability and applicability of the formulation, and/or to improve the texture, appearance and uniformity of a hardened coating made from the formulation.

According to embodiments of the invention, the surface energy or surface chemistry of the porous surface may be adjusted using selected resins, co-resins or surface-active agents to best accommodate marking materials or to best facilitate cell growth. Agents which may be used according to embodiments of the invention, to adjust surface energy, include surfactants, fluorosurfactants and siliconized glass particles. Resins and co-resins having polar, nonpolar, charged, uncharged, aromatic, saturated or sequenced substituents or backbones may be used to adjust surface chemistry.

Porous-coated laboratory apparatus according to embodiments of the present invention may comprise a wide variety of materials. Plastic or glass is often used to manufacture low-cost laboratory apparatus. Some preferred materials used to manufacture laboratory apparatus include silica glass, polypropylene, polyethylene, polyethyleneterephthalate, polystyrene, polycarbonate and cellulosics. Glass products including silica glass are commonly used to manufacture laboratory vessels. One exemplary glass product is PYRBX® (available from Coming Glass, Corning, N.Y.). Laboratory apparatus comprising relatively expensive plastics such as polytetrafluoroethylene and other fluorinated polymers may also be used. Because polypropylene is inexpensive, it is a particularly preferred material for laboratory vessels, including pipette tips, used for handling and transporting minute and precise amounts of biological sample.

In addition to the materials mentioned above, examples of other suitable materials for the laboratory apparatus of the present invention include polyolefins, polyamides, polyesters, silicones, polyurethanes, epoxies, acrylics, polyacrylates, polyesters, polysulfones, polymethacrylates, polycarbonate, PEEK, polyimide, polystyrene, and fluoropolymers such as PTFE Teflon®, FEP Teflon®, Tefzel®, poly(vinylidene fluoride), PVDF, and perfluoroalkoxy resins. Ceramic or oxide surfaces may be coated according to embodiments of the invention. Cellulosic products, for example, paper and reinforced paper containers, can be coated to form coated laboratory apparatus according to embodiments of the invention. Metal surfaces can be coated according to the invention, as can surfaces of glass, silicon, silicon compounds or ceramics that may or may not have been primed with silane containing materials or other adhesion promoting materials. Primed metal, primed glass, primed ceramic and primed oxide surfaces may be coated with coating formulations according to embodiments of the invention. Apparatus surfaces that have been pre-coated with epoxies, silicones, urethanes, acrylics, or other materials can also be coated according to embodiments of the invention.

Preferred methods for applying the coating formulations of the present invention are pad printing methods. Other coating methods may be used, including screen printing, spray coating, brush coating, fogging, transferring, painting, stenciling and ink jet printing.

After forming a first coating of polymer according to the invention, the methods of the invention may also comprise applying at least one other coating formulation to the first coating.

EXAMPLE 1

A highly chemically and solvent resistant porous coating for a microscope slide was prepared. The coating was provided from a coating formulation having the following ingredients:

- 850 grams high functionality novolac epoxy resin, available as D.E.N. 439 from The Dow Chemical Company, Midland, Mich., having an epoxy functionality of 3.9, an epoxy equivalent weight of about 220, and a high cross-link density;
- 70 grams dicyandiamide as a reactant agent for curing the epoxy, based on the weight of the epoxy;
- 43 grams gamma-glycidoxypropyltrimethoxysilane adhesion promoter;
- 2125 grams calcinated pigment;
- 450 grams epoxy solvent triethylphosphate to liquefy and reduce the viscosity of the epoxy;
- 8 grams TEFLON MP 1300 dispersing agent; and
- 8 grams FLUORINERT Liquid FC-70 blowing agent.

The coating formulation was mixed, screen printed on a microscope slide and heat cured at 180° C. for 30 minutes. The resultant cured and dried coating exhibited excellent chemical resistance to sodium hydroxide solution and to boiling water. The porous surface of the coating exhibited excellent and permanent retention of pen and pencil marking materials. The porous surface was very hard and had a pencil hardness of greater than 8 using penetration of a 1 mil-thick coating using 1 pound of normal force for hardness testing.

EXAMPLE 2 AND COMPARATIVE 1

The chemical resistance and hardness of a coating (Example 2) made from the coating formulation of Example 1 above was compared to the chemical resistance and hardness of a SUPERFROST™ coating (Comparative 1) available from Erie Scientific Corporation, Portsmouth, N.H. The SUPERFROST™ coating is believed to be made in accordance with the teachings of U.S. Pat. No. 4,481,246 to Melisz et al., discussed above, and is believed to comprise about 3 times as much, by weight, granular medium as epoxy resin. Microscope slides coated with the exemplary formulation of the present invention (Example 2) and the SUPERFROST™ coating formulation (Comparative 1) were soaked for 24 hours in the various liquids and solvents shown in Table I below. The Table shows the pencil hardness measured to penetrate a 1 mil thick coating of each respective formulation using a 1 pound normal testing force.

TABLE I

| | Pencil Hardness to Penetrate 1 Mil Thick Coating Using 1 Pound of Normal Force | |
|---|---|---|
| SOLVENT USED FOR 24-HOUR SOAK | SUPERFROST COATING (Comparative 1) | PRESENT INVENTION (Example 2) |
| no soak | 8 | >8 |
| acetone | 8 | >8 |
| ethanol | 6 | >8 |
| xylene | 6 | >8 |
| boiling deionized water | 5 | >8 |
| 2% (w/w) HCl in ethanol | 4 | >8 |
| 2% (w/w) NaOH in deionized water | 0 | >8 |

As can be seen from Table I above, the coating formulation of the present invention exhibits superior chemical resistance and hardness compared to the SUPERFROST™ coating formulation. In addition, a powder resulted when the SUPERFROST™ coating was abraded with a #8 pencil, whereas no powder resulted from similarly abrading the Example 2 coating of the present invention. Also, the SUPERFROST™ coating came off spontaneously during soaking in the 2% sodium hydroxide solution whereas the coating of the present invention was chemically resistant to the sodium hydroxide solution.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A laboratory apparatus having a porous coating formed on a surface thereof, said porous coating having a thickness of less than about 100 mils and comprising the hardened product of a coating formulation, said formulation comprising 100 parts by weight hardenable resinous material, and from about 0.1 to about 50 parts by weight blowing agent based on the 100 parts by weight resinous material, said hardened product comprising hardened resinous material, gas cells at least partially entrapped within said hardened resinous material, and a porous surface.

2. A laboratory apparatus as claimed in claim 1 wherein said hardened product comprises gas cells having openings at the surface of the coating.

3. A laboratory apparatus as claimed in claim 1 wherein said hardened product comprises gas cells which are closed adjacent the surface of the porous coating and ruptured to form openings at the surface of said coating upon force applied by marking with a marking instrument.

4. A laboratory apparatus as claimed in claim 1 wherein said porous coating retains a marking material and is substantially chemically resistant to sodium hydroxide solutions and boiling water.

5. A laboratory apparatus as claimed in claim 1 wherein said porous coating is scratch-resistant to a #4 pencil.

6. A laboratory apparatus as claimed in claim 1 wherein said hardenable resinous material is curable and said coating formulation further comprises an amount of curing agent effective to cure and harden said resinous material.

7. A laboratory apparatus as claimed in claim 6 wherein said resinous material comprises a curable epoxy resin and said curing agent comprises dicyandiamide.

8. A laboratory apparatus as claimed in claim 1 wherein said resinous material comprises a curable urethane resin.

9. A laboratory apparatus as claimed in claim 1 wherein said resinous material comprises an unsaturated resinous material.

10. A laboratory apparatus as claimed in claim 1 wherein said blowing agent comprises a fluorinated liquid.

11. A laboratory apparatus as claimed in claim 1 wherein said coating formulation further comprises an effective amount of adhesion promoter material to substantially improve adhesion of the hardenable resinous material to said surface of the laboratory apparatus.

12. A laboratory apparatus as claimed in claim 1 wherein said coating formulation further comprising an effective amount of solvent to decrease the viscosity of the coating formulation, and said formulation having been applied by a screen printing, ink jet printing or pad printing technique.

13. A laboratory apparatus as claimed in claim 1 wherein said coating formulation further comprises pigment present in an amount of up to 300 parts by weight based on the 100 parts by weight resinous material.

14. A laboratory apparatus as claimed in claim 1 further comprising a marking medium retained by said porous surface.

15. A laboratory apparatus as claimed in claim 1 wherein said porous coating has a thickness of less than about 2 mils.

16. A laboratory apparatus as claimed in claim 1 wherein said porous coating has a thickness of less than or equal to about 1 mil.

17. A laboratory apparatus having a porous coating formed on a surface thereof, said porous coating having a thickness of less than about 100 mils and comprising the hardened product of a coating formulation, said formulation comprising 100 parts by weight hardenable resinous material, and from about 0.1 to about 50 parts by weight blowing agent based on the 100 parts by weight resinous material, said hardened product comprising hardened resinous material, gas cells at least partially entrapped within said hardened resinous material, and a porous surface, wherein said porous coating is scratch-resistant to a #6 pencil.

18. A laboratory apparatus as claimed in claim 17 wherein said porous coating is scratch resistant to a #8 pencil.

19. A laboratory apparatus having a porous coating formed on a surface thereof, said porous coating having a thickness of less than about 100 mils and comprising the hardened product of a coating formulation, said formulation comprising 100 parts by weight hardenable resinous material, and from about 0.1 to about 50 parts by weight blowing agent based on the 100 parts by weight resinous material, said hardened product comprising hardened resinous material, gas cells at least partially entrapped within said hardened resinous material, and a porous surface, wherein a biological sample is retained by said porous surface.

20. A laboratory apparatus as claimed in claim 1 wherein said apparatus comprises at least one member selected from the group consisting of microscope slides, microscope slide assemblies, microscope slide cover slips, petri dishes, vials, flasks, test tubes, syringes, sample chambers for analytical devices, tapes, laminates, plates, arrays, and tubing.

21. A laboratory apparatus as claimed in claim 1 wherein said apparatus has an operational surface comprising plastic which is rough, pitted, grooved, cross-hatched or striated.

* * * * *